United States Patent [19]

Bouboulis

[11] 3,843,691

[45] Oct. 22, 1974

[54] CATALYTIC EPOXIDATION WITH MOLECULAR OXYGEN

[75] Inventor: Constantine J. Bouboulis, Union, N.J.

[73] Assignee: Esso Research and Engineering Company, Linden, N.J.

[22] Filed: Dec. 1, 1972

[21] Appl. No.: 311,285

[52] U.S. Cl....... 260/348.5 V, 252/431 C, 260/414, 260/439 R
[51] Int. Cl............................................. C07d 1/08
[58] Field of Search............................ 260/348.5 V

[56] References Cited
FOREIGN PATENTS OR APPLICATIONS 1,023,878   3/1966   Great Britain............... 260/348.5 V
1,209,321   10/1970   Great Britain............... 260/348.5 V Primary Examiner—Norma S. Milestone

[57] ABSTRACT

Direct epoxidation of olefins is carried out in the liquid phase with molecular oxygen in the presence of transition metal complexes of fluorinated diketones. The additional presence of carboxylic acid ligands and free acid or its anhydrides enhances the rate of reaction and selectivity to epoxides. The olefin oxide products of the present invention are useful for formulation into polymers, and serve as starting materials for many items of commercial importance such as antifreeze compositions and the like.

11 Claims, No Drawings

CATALYTIC EPOXIDATION WITH MOLECULAR OXYGEN

BACKGROUND OF THE INVENTION

1. Field of the Invention

This invention is directed to a new and improved process for the preparation of olefin oxides. It is further directed to the preparation of in situ transition metal complexes of fluorinated diketones, which are found to enhance the reactivity and selectivity in the preparation of olefin oxides or epoxides. More particularly the invention relates to a process for the direct epoxidation of olefins with molecular oxygen in the presence of transition metal complexes of fluorinated diketones; said complexes additionally containing carboxylic acid ligands, particularly the hindered acid varieties.

2. Description of the Prior Art

Olefin oxides are extremely useful articles of commerce. They are used as starting materials for the preparation of antifreeze compositions, humectants, pharmaceutical preparations, cosmetic formulations, as monomers for the preparation of polymers and the like. Currently, epoxides, such as ethylene oxide and propylene oxide are prepared respectively by the vapor phase catalytic method and by the classic two-step chlorohydrin route. The vapor phase process is confined to the preparation of ethylene oxide, as higher olefins cannot be converted via said vapor phase process to the corresponding higher oxides, economically.

The chlorohydrin route is an indirect method which uses hyporchlorous acid as the oxygen carrier. The hyporchlorous acid adds to the olefinic double bond to form the chlorohydrin, which is dehydrohalogenated with calcium oxide to give the epoxide and calcium chloride. The disadvantage of this type process is that more than two pounds of calcium chloride are formed per pound of propylene oxide product. The process is economically attractive, only when the producer is basic in chlorine and is using depreciated plant equipment.

Another classic method is the epoxidation of olefins with peracetic acid which is produced by air oxidation of acetaldehyde. The process is a hazardous one, due to the explosive nature of peracetic acid, and it requires that the equipment be of special steel in order to withstand the corrosive action of the acetic and formic acid by-products. The oxygen carrier is the peracetic acid and it is almost mandatory for the producer to be in the acetic acid business, since the process results in the production of large amounts of by-product acetic acid. Epoxides are also produced commercially by oxidizing olefins with hydroperoxides in the presence of molybdenum catalysts.

In U.S. Pat. No. 3,351,635 such a method is claimed wherein the hydroperoxide reactants preferred are materials such as cumene hydroperoxide and ethylbenzene hydroperoxide and catalysts such as molybdenum, tungsten, titanium dissolved moieties are utilized. The process also employs the use of base such as sodium hydroxide and the like. A refinement of the above method is claimed in British Pat. No. 1,198,327 wherein a technique for the recovery and recycle of the hydroperoxide successor materials, typically alkylaromatics, is described.

Other prior art processes relating to liquid phase oxidation processes for olefin oxidations include various specific oxidation catalysts as found in U.S. Pat. Nos. 2,741,623, 2,837,424, 2,974,161 and 2,985,668; another patent teaches the use of water immiscible hydrocarbon solvents alone or in the presence of polymerization inhibitors such as nitrobenzene (U.S. Pat. No. 2,780,635) or saturated hydrocarbons (U.S. Pat. No. 2,780,634); another method describes the use of neutralizers such as alkali metal and alkaline earth metal hydroxides or salts of these metals (U.S. Pat. No. 2,838,524); another route involves the use of certain catalysts in the alkaline phase (U.S. Pat. No. 2,366,724). Each of the foregoing represent various prior art approaches to overcoming the problems encountered in the utilization of a liquid phase oxidation process to obtain olefin oxides. Additionally, in most of the prior art cases discussed above, selectivities to the epoxide are below 50 percent, and become even lower when used with alpha-olefins which are well known to the art as being more difficult to epoxidize.

It is also known that olefins can be oxidized to olefin oxides, in the liquid phase, with molecular oxygen, in the presence of heavy metal catalysts such as salts of cobalt, vanadium, manganese and copper.

SUMMARY OF THE INVENTION

In accordance with the present invention, it has been unexpectedly found that transition metal complexes of fluorinated 1,3-diketones and hindered carboxylic acids, catalyze the reaction of olefins in the liquid phase with molecular oxygen to produce epoxides in selectivities of up to 69 percent. The efficiency of these transition metal fluorinated diketone-hindered carboxylic acid complexes is believed due to the fact that if transition metals such as cobalt are to act effectively as oxidation catalysts, said metals must have an optimum oxidation potential. Ligand groups attached to the transition metal, i.e., cobalt, act as modifiers of the oxidation potential of the metal. Fluorinating the alkyl groups of the ligands increases the electronegativity of the ligands and decreases the strength of the transition metal peroxide bonding, i.e., the bonding between $M-O_2$, and as this bonding becomes weaker, the rate of oxidation increases. However, if the $M-O_2$ bond becomes too weak, the catalyst complex is unstable, hence the need for optimizing this bond strength. It has also been unexpectedly found that when the transition metal complexes contain neoacids or hindered acids as ligands, more generally described as salts of alpha trisubstituted carboxylic acids that the oxidation potential of the transition metal is modified suitably to result in increased rates of reaction and selectivities to the epoxide products when said modified transition metal complexes are employed as catalysts in a liquid phase, direct oxidation of olefins process.

The transition metal complexes utilized in the present invention containing the kinds of ligands hereinafter described, are found to be more selective for the formation of epoxides and in addition, they do not react with lower carboxylic acids such as formic acid and the like. Hence, the oxidation activity of these catalysts at higher olefin conversions, decreases much slower than the prior art recognized cobalt oxidation catalysts, such as cobalt oxide and cobalt carbonate, cobalt acetylacetonate and cobalt carboxylates.

The catalysts which may be employed in the present invention may be generally described as transition metal complexes of fluorinated diketones and containing hindered acid ligands. More particularly, these transition metal complexes may be represented by the following generic formula:

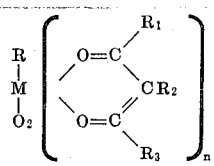

wherein M is a transition metal, R is an anion of an alpha trisubstituted carboxylic acid having the following formula:

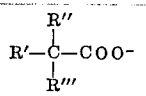

wherein R', R'', R''' are alkyl groups containing from 1 to 20 carbon atoms, preferably from 1 to 10 and most preferably from 1 to 6 carbon atoms; $R_1$ and $R_3$ of the above generic formula are fluorinated aliphatic or aromatic hydrocarbon groups containing from $C_1$ to $C_{20}$ carbon atoms, preferably from $C_1$ to $C_{10}$ carbon atoms, most preferably from $C_1$ to $C_7$ carbon atoms; $R_2$ of the above generic formula is a radical selected from the group consisting of hydrogen radicals, unsubstituted alkyl group radicals, and fluorinated aliphatic or aromatic hydrocarbon groups of $C_1$ to $C_{20}$ carbon atoms, preferably $C_1$ to $C_{10}$ carbon atoms, most preferably from $C_1$ to $C_7$ carbon atoms, n of the generic formula above is a number from 1 to 2, preferably however, n is 1.2 to 1.5. M of the above formula may in general be a transition metal, preferably, however, M is cobalt or manganese; most preferably cobalt is the metal employed.

Suitable ligand precursors useful in making suitable catalysts for the present invention, may be represented by the following nonlimiting representative examples including 1,1,1,-5,5,5-hexafluoro-2,4 pentanediene; 1,1,1,5,5,6,6,7,7,7-decafluoro-2,4-heptanedione; 1,1,-1-trifluoro-2,4-pentanedione; 1,1,1,5,5-pentafluoro-5-phenyl-2,4-pentanedione; 1,1,1,5,5,-6,6-heptafluoro-6(pentafluorophenyl)-2,4-hexanedione; 1,1,1,-5,5,5-hexafluoro-3(pentafluoroethyl)-2,4-pentanedione.

The above catalyst species are prepared in situ in the reaction chamber, prior to, or during the course of the reaction by adding sufficient amounts of the cobalt salt of a hindered carboxylic acid such as cobalt neodecanoate together with sufficient amount of fluorinated 1,3-diketone, such as decafluoro 2,4-heptadione along with sufficient solvent and molecular oxygen. During the course of this reaction, a catalyst species represented by the formula is believed to exist which provides the catalytic active species for the olefin oxidation.

While not tending to be bound by any particular theory, it is believed that the following is a plausible reaction mechanism when neoacid is used as a coligand and when neoacid anhydride is present.

1. Neoacid Coligand

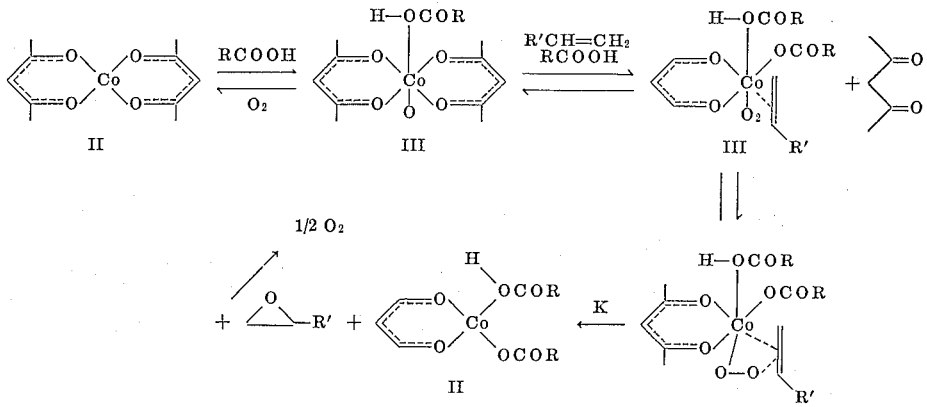

In Presence of Neoacid Anhydride

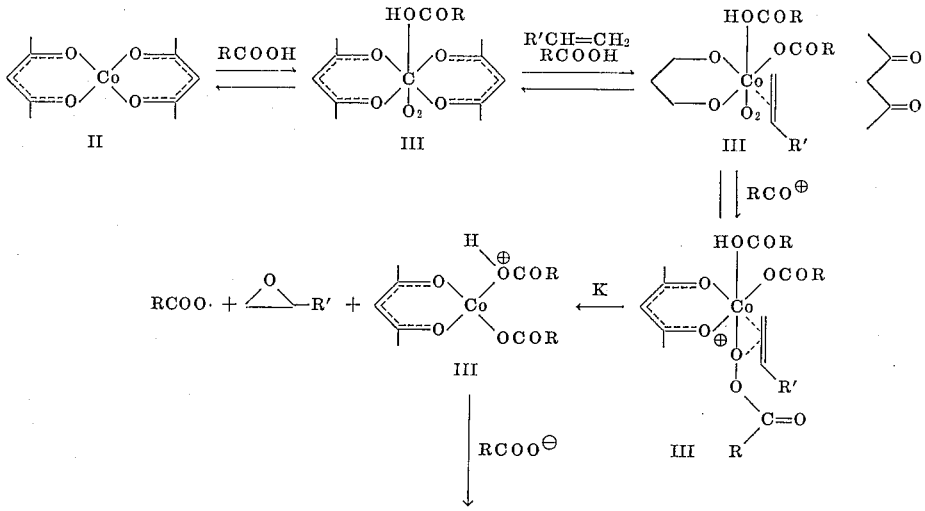

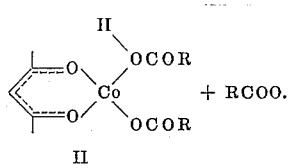 + RCOO.

Side Reactions

RCOO. + R''—CH₂CH=CH₂ → RCOOH + R'' ĊH CH=CH₂

R''ĊHCH=CH₂ + O₂ ⟶ R''—CHCH=CH — ⟶ 
 |
 O—OH

R''—CHCH—CH₂
 |       \O/
 OH

By way of background 1,3-diketones are a class of organic compounds believed to exist during reactions in a keto-enol tautomeric equilibrium, said equilibrium may be represented by the general structures:

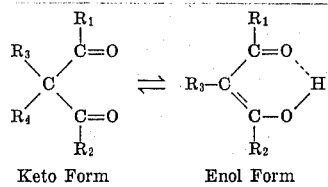

Keto Form       Enol Form wherein R₁ and R₂ may be alkyl, fluorinated alkyl, aromatic, heterocyclic and other groups. The negative ion formed by the removal of a proton from the above keto-enol structures may serve as a coordinating ligand to almost any positive ion of an element and form what is known as a complex. The organometallic compounds as derived from the coordination of the ligand ions and the metal ions are known as metal beta diketones or metal beta keto-enolates. Under suitable conditions cationic, neutral and anionic metal complexes can be formed. Many of the neutral metal complexes are readily soluble in organic solvents and can be vaporized and some distilled. The unusual properties of metal beta diketones have been studied for many years. The ligand ions of beta diketones may form complexes with metal ions in many ways; they may form monomeric complexes, they may form polymeric complexes, they may form mixed ligand complexes or they may form various types of isomeric complexes.

During the operation of the present invention, it is believed, however, that the active catalyst species does not contain 2,-bidentate diketone ligands per gram-atom of cobalt since it has been demonstrated that both the rate and selectivity to epoxide is increased when the ratio of cobalt to bidentate diketone ligands was changed from ½ to 1/1.5 or 1/1.3.

In another preferred embodiment, the process may be carried out in the presence of an additional amount of carboxylic acid anhydride. It has been unexpectedly discovered that when an amount of the anhydride of the carboxylic acid ligand is present in the reaction mixture, the rate of epoxidation is increased as well as the selectivity. It has been found that, e.g., the rate of olefin conversion is increased, as the neodecanoic anhydride concentration increases up to a ratio of anhydride to cobalt of about 20:1. The anhydride may be added in the beginning of the reaction or in stages of the reaction but it is preferred to continuously add anhydride throughout the reaction in order to maintain a more or less constant concentration. Stable anhydrides which are stable under the conditions of the epoxidation such as cis 1,2-cyclohexane dicarboxylic acid anhydride do not have any effect on the reaction. Suitable anhydrides that will enhance the reaction rates and selectivities include α, α-dimethyloctanoic acid anhydride, α methyl-α ethyloctanoic acid anhydride, α methyl, α ethylheptanoic acid anhydride, neodecanoic acid anhydride and the like.

Olefins which may be employed in the present invention include those of the ethylenic and cycloethylenic series having from 2 up to 20 carbon atoms per molecule, for example, ethylene, propylene, butenes, pentenes, hexene, heptene, octene, nonene, dodecene, pentadecene, heptadecene, octadecene, cyclobutene, cyclopentene, cyclohexene, cyclooctene, etc. Of particular interest, utility and convenience are the olefins containing from 2 to 12 carbon atoms, including the alkyl substituted olefins, such as 2-methyl 1-butene, 2-methyl 2-butene, 2-methyl propene, 4-methyl 2-pentene, 2-ethyl 3-methyl 1-butene, 2,3-dimethyl 2-butene and 2-methyl 2-pentene. The process, however, is also useful with acyclic, aliphatic, terminal monoolefins where the carbon atoms of the carbon-carbon double bond have three hydrogen substituents, particularly the normal acyclic, α-olefins, such as propylene, 1-butene, 1-pentene, 1-hexene, 1-heptene, 1-octene, 1-dodecene; also preferred are the substituted olefins having alkyl substitution at the beta carbon atoms, such as 2-methylheptene-1,2-methyloctene-1,2-ethylheptene-1,2-methylcyclohexane, 2-methyl-2-ethylhexene-1 and the like. Other suitable olefinic compounds include butadienes, isoprene, pentadienes, hexadienes and the like. The catalysts are also useful in the epoxidation of olefins, which are substituted as well as unsubstituted. By substituted is meant olefin chains having groups such as esters and ethers attached thereto. The catalysts are also useful for the epoxidation of polymers having terminal double bonds, such as butadiene polymers, isoprene polymers, butadiene-styrene copolymers and the like. Particularly, suitable olefin feedstocks contemplated include the pure olefin or mixtures thereof or olefin stocks containing as much as 50 percent of saturated compounds. Olefin feed materials include those formed by cracking petroleum stock such as hydrocarbon oils, paraffin wax, lubricating oil stocks, gas oils, kerosenes, naphthas and the like.

The reaction temperature used in liquid phase olefin oxidations by the present invention are not critical and they may range from a lower limit below which oxidation either proceeds too slowly or follows a course other than that leading to olefin oxides to an upper limit for the temperature being a threshold above which substantial decomposition, polymerization, or excessive oxidative side reactions occur thereby leading to undesirable side reactions and products which substantially detract from the yield of the olefin oxide. In general, however, temperatures will be in the range of from 70° to 150°C., more preferably 85° to 100°C.

Subatmospheric, atmospheric or superatmospheric pressures are suitable for use in the instant invention, that is, pressures ranging from 0.5 to 150 atmospheres may be employed, preferably, however, pressures will be in the range of from 1 to 10 atmospheres. The pressures selected will of course depend upon the characteristics of the individual olefin, which is to be oxidized and which would be suitable in combination with the temperatures of the reaction.

The process of the invention is preferably conducted, in the liquid phase, in solvents or diluents which are substantially oxidatively inert, thermally stable and liquid at the reaction temperature and pressure. Materials, suitably employed as solvents include halomonoaromatics, such as chlorobenzene, bromobenzene and dichlorobenzene, saturated aliphatic, alicyclic, or aromatic nitriles having from 2 to 18 carbon atoms, preferably from 2 to 18 carbon atoms, suitable alicyclic and aromatic nitriles having up to 6 carbon atoms in the ring and including cycloalkane nitriles and the like. Also suitable as solvents are alcohols, both aliphatic and aromatic having from 2 to 18 carbon atoms and from 1 to 2 hydroxy groups; preferably however, chlorinated aromatics are the best all round solvents.

The source of oxygen is not critical and oxygen may be suitably charged as pure molecular oxygen or diluted with an inert gas such as nitrogen or argon. Air is a suitable oxygen-containing gas. Particularly preferred, however, for use in the present invention is molecular oxygen without additional inert gas diluents.

The transition metal complex catalysts are preferably present in catalytic amounts relative to the olefinic reactant. Amounts of catalyst are generally in the range of from 0.1 to 0.001 molar, preferably from 0.05 to 0.008 and most preferably, from 0.01 to 0.015 molar. The amount of olefin employed is generally in the range of from 0.01 to 4 molar, preferably from 0.1 to 2 molar and most preferably from 0.1 to 1.0 molar. The amount of cobalt salt of α-trisubstituted carboxylic acids such as cobalt neodecanoate employed is from 0.005 to 0.02 preferably 0.01 molar. The amounts of acid or acid anhydride coligand such as neodecanoic acid and the like are in the range of from 0.005 to 0.5, preferably 0.1 to 0.5, most preferably about 0.2 molar. The transition metal complex is produced in situ during the course of the reaction by the addition of the proper amounts of the metal salt of the alpha trisubstituted carboxylic acid, i.e., cobalt neodecanoate to which is added certain amounts of a 1,3-diketone and additionally an amount of the anhydride of the neodecanoic acid employed may also be used to enhance the rate of the reaction.

The presence for example of a small amount from 10 to 20 moles per gram atom of metal of free hindered acid or its anhydride will help to enhance the rate of reaction and selectivity to the epoxide.

In a typical reaction procedure, chlorobenzene, octene-1, cobalt neodecanoate, 1,1,1,5,5,5-hexafluoro 2,4-pentadione and neodecanoic acid are charged to an all glass reactor equipped with a mechanical stirrer, a condenser and a gas inlet. The reaction mixture is heated under constant stirring to 100°C., while oxygen is passed through. Samples are withdrawn and analyzed by gas chromatography against known reference standards.

The olefin oxide products of the present invention are materials of established utility and many are chemicals of commerce. For example, illustrative olefin oxides which are readily prepared by the process of the present invention such as propylene oxide, 1,2-epoxybutane, 1,2-epoxydodecene, 1,2-epoxyheptadecane are formulated into useful polymers by polymerization or copolymerization as disclosed by U.S. Pat. Nos. 2,815,343, 2,871,219 and 2,987,489.

To further illustrate the improved process of the present invention, the following examples are provided, however, it is to be understood that the details thereof, are not to be regarded as limitations as they may be varied as will be understood by one skilled in the art.

EXAMPLE 1

In an all glass reactor equipped with a mechanical stirrer, a condenser and a gas inlet were introduced 60 ml. chlorobenzene, 15 g. of octene-1, 0.257 g. (0.00063 mole) cobalt neodecanoate, 0.170 g. (0.00082 mole) 1,1,1,5,5,5-hexafluoro-2,4-pentanedione and 1.5 g. neodecanoic acid. The reaction mixture was heated under constant stirring at 100°C. while oxygen was passed through. Periodically samples were withdrawn and analyzed by gas chromatography. The results are set forth in Table I below.

EXAMPLE 2

A similar experiment as in Example (1) was performed with 0.63 m moles of cobalt neodecanoate, 0.95 m moles of 1,1,1,5,5,5-hexafluoro-2,4-pentanedione and 3.0 g of neodecanoic anhydride instead of neodecanoic acid. The experimental results are listed in Table I below.

EXAMPLE 3

In this experiment, the catalyst complex was prepared from 0.340 g (0.84 m mole) cobalt neodecanoate and 0.309 g (1.0 m mole) 1,1,1,5,5,6,6,7,7,7-decafluoro-2,4-heptanedione which were mixed with a solution of 15 g octene-1 and 3.0 g neodecanoic anhydride in 60 ml of chlorobenzene. The reaction conditions were the same with those of Examples (1) and (2). After the octene-1 conversion was about 10 percent additional neodecanoic anhydride was introduced at the rate of 1.7 ml per hour. The results of this Example may be found in Table I below.

EXAMPLE 4

In order to demonstrate the advantage of using the cobalt complexes of the present invention, an experiment similar to Example (1) was conducted where the catalyst was 0.340 (0.84 m mole) of cobalt neodecanoate. The result of this run is summarized in Table I below.

TABLE I

| Example | % Olefin Conversion | % Selectivity to epoxide | Reaction time (hrs) |
| --- | --- | --- | --- |
| No. 1 | 7.3 | 59.2 | 1.1 |
|  | 15.2 | 46.6 | 3.4 |
|  | 22.5 | 47.9 | 4.2 |
| No. 2 | 6.47 | 69.7 | 0.58 |
|  | 13.50 | 60.5 | 1.16 |
|  | 21.86 | 51.7 | 2.0 |
|  | 31.0 | 51.6 | 2.9 |
| No. 3 | 5.9 | 57.0 | 0.25 |
|  | 11.2 | 55.0 | 0.58 |
|  | 18.3 | 56.0 | 1.0 |
|  | 26.2 | 53.2 | 1.6 |
|  | 35.9 | 51.3 | 2.4 |
| No. 4 | 3.2 | 11.9 | 1.34 |
|  | 4.7 | 14.4 | 1.75 |
|  | 9.9 | 19.8 | 3.16 |
|  | 17.3 | 24.6 | 4.67 |

The results of Examples 1-4 as found in Table I, exemplify the improved conversions and selectivities obtained when catalysts containing fluorinated diketones are employed (Examples 1-3) when compared to the use of the cobalt catalyst without fluorinated diketones (Example 4). Additionally, when the results of Examples 2 and 3 are compared with Example 1 results, it is seen that the use of neodecanoic acid anhydride enhances reaction rate over the rate obtained when neodecanoic acid is employed as the coligand.

EXAMPLE 5

In a glass reactor equipped with a mechanical stirrer, a condenser and a gas inlet were introduced 60 ml. chlorobenzene, 15 g of octene-1, 0.401 g of manganese naphthenate (0.44 mole) and 0.186 g (0.88 mole) 1,1,-1,5,5,5-hexafluoro-2,4-pentanedione. The reaction mixture was heated with continuous stirring while oxygen was bubbled through. Chromatographic analysis of the reaction mixture at one-half hour time intervals indicated that maximum selectivity to epoxide was 22 percent at 48.5 percent conversion. This example illustrates that manganese salts are useful catalysts.

EXAMPLES 6-14

A series of experiments were performed where the type of ligands used were of different degrees of electro-negativity. For instance, cobalt complexes were synthesized, in situ or separately, with dimethylglyoxime, acetylacetone, cis-1,2-cyclobutanedinitrile, 1,1,-1-trifluoro-2,4-pentanedione and 1,1,1,5,5,5-hexafluoro-2,4-pentanedione by using 2 moles of ligand per atom of cobalt. These catalyst complexes were used in separate expoxidation experiments at 0.008 molar concentration. The solvent was chlorobenzene and the temperature 100°C. Mechanical stirring was applied throughout the runs and oxygen was passed through the solution. The progress of the epoxidation was followed by periodically analyzing samples with gas phase chromatography. The results of these runs are shown in the following Table II and they indicate that by using ligands with higher electronegativity, the selectivity towards the formation of epoxide is increased.

A similar set of experiments was performed by using manganese as the metal of the metal-ligand complex and again the selectivity increased with the diketonate ligands of higher electronegativity.

EXAMPLES 15-20

To demonstrate a further improvement in selectivity by using as a coligand a hindered carboxylic acid (neoacid) which has a higher pKa than straight chain aliphatic acids, a series of experiments was carried out where the catalyst was made in situ from the cobalt salt of a number of carboxylic acids of different pKa's. 0.6 m moles of the cobalt salt was added to a mixture of 60 ml. chlorobenzene and 15 g octene-1. To the total mixture 0.250 g (1.2 m moles) of 1,1,1,5,5,5-hexafluoro-2,4-pentanedione was added and the mixture was heated at 100°C. while oxygen was passed through. The results of these runs are tabulated in the following Table III and show that higher rates and selectivities are obtained with weaker carboxylic acid coligands.

TABLE III

Selectivity and rate vs acidity of ligand (L)

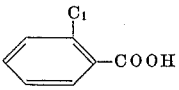

| Acid | CF₃COOH | Cl-C₆H₄-COOH | CH₃COOH | C₇COOH | Neodecanoic |
|---|---|---|---|---|---|
| pKa | 0.10 | 2.98 | 4.75 | 4.89 | 5.05 |
| Percent selectivity (max.) | 23 | 27 | 30 | 40 | 55 |
| Relative rate | V. slow | Slow | Slow | Slow | Fast |

EXAMPLES 21-23

These Examples (21-23) show the effect of the ligand/cobalt ratio on selectivity. Three experiments were conducted with 15 g octene-1 in 60 ml. chlorobenzene with a ratio of fluorinated diketone/cobalt of 2, 1.3 and 1.5. Cobalt neodecanoate 0.170 g (0.42 m moles) was used in each case with 0.175, 0.114 and 0.131 g of 1,1,1,5,5,5-hexafluoro-2,4-pentanedione respectively. 3.0 g of neodecanoic anhydride was added to each reaction mixture and oxygen was passed through with stirring at a reaction temperature of 100°C. The selectivities obtained in these runs are tabulated in the following Table IV. The results obtained indicate that the active catalyst species does not contain two bidentate ligands per molecule of cobalt but rather the catalyst complex which exists contains from about 1.3 – 1.5 bidentate ligands per molecule of cobalt.

TABLE IV

| HF-Ac/Co[1] | % Epoxide Selectivity (Max.) | % Olefin Conversion |
|---|---|---|
| 2 | 55.4 | 5.9 |
| 1.3 | 66.6 | 8.2 |
| 1.5 | 69.7 | 6.5 |

[1] 1,1,1,5,5,5-hexafluoro-2,4-pentanedione

TABLE II

———Ligand electronegativity———→

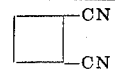

| Metal salt | C—C=NOH / C—C=NOH | RCOO-AcAc | -CN / -CN | TF-Ac[1] | HF-Ac[2] | Remarks |
|---|---|---|---|---|---|---|
| Co octoate | 0 | 16 | 29 | 31 | 40 | Percent selectivity of epoxide. |
| Mn naphthenate | <1 | 2 | 19.5 | 22 | | Do. |

[1] TF-Ac=1,1,1-trifluoro-2,4-pentanedione.
[2] HF-Ac=1,1,1,5,5,5-hexafluoro-2,4-pentanedione.

EXAMPLE 24

Chlorobenzene 60 ml., 14.9 g 2-methylheptene-1, 0.425 g (1.05 m moles) cobalt neodecanoate, 0.387 g (1.25 m mole) 1,1,1,5,5,6,6,7,7,7-decafluoro-2,4-heptanedione and 3.0 g neodecanoic anhydride were placed in the same glass reactor as in the previous experiments (Examples 5–23) and were heated at 100°C. with constant stirring while oxygen was bubbled through the reaction mixture. Samples were periodically withdrawn and analyzed by Gas Phase Chromatography indicating a fast reaction rate (40 percent olefin conversion in one hour) and a maximum selectivity to the epoxide of 72.7 percent. This Example demonstrates the significant selectivities obtained with 2-substituted olefins as feedstocks.

EXAMPLE 25

In a glass reactor equipped with a mechanical stirrer, a condenser, a bubbler and a thermometer were introduced 55 ml of chlorobenzene, 20 g (0.178 mole) octene-1, 0.340 g (0.84 m mole) of cobalt neodecanoate, 0.310 g (1.0 m mole) 1,1,1,5,5,6,6,7,7,7-decafluoro-2,4-heptanedione and 3.0 g neodecanoic anhydride. The reaction mixture was heated at 100°C under constant stirring while oxygen was passed through. Maximum selectivity was 56 percent at 4.6 percent olefin conversion.

EXAMPLE 26

This experiment was conducted in a similar manner as Example 25 but with 60 ml chlorobenzene, 15 g (0.133 mole) octene-1, 0.510 g (1.25 m mole) cobalt neodecanoate, 0.464 g (1.5 m mole) 1,1,1,5,5,6,6,7,7,-7-decafluoro-2,4-heptanedione and 3.0 g neodecanoic anhydride. Maximum selectivity to epoxide was 60.1 percent at 6.0 percent conversion.

What is claimed is:

1. A process for preparing an olefin oxide by contacting a monoolefin containing from 3 to 20 carbon atoms in the liquid phase at a temperature of from 70° to 150°C., with molecular oxygen in the presence of a catalytic amount of a transition metal complex of fluorinated diketone, said diketone complex being produced in situ by contacting cobalt neodecanoate with a fluorinated 1,3-diketone in at least a 1:2 mole ratio of cobalt neodecanoate to 1,3-diketone, said diketone complex having the following generic formula:

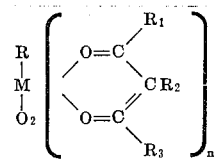

wherein M is cobalt, R is an anion of neodecanoic acid; $R_1$ and $R_3$ are radicals independently selected from the group consisting of fluorinated aliphatic hydrocarbon chains of from 1 to 20 carbon atoms; $R_2$ is a radical selected from the group consisting of hydrogen, unsubstituted alkyl groups having from 1 to 20 carbon atoms and fluorinated aliphatic hydrocarbon chains of 1 to 20 carbon atoms; n is a number from 1 to less than or equal to 2, said contacting being conducted in the presence of a solvent and thereafter recovering a yield of said olefin oxide.

2. The process of claim 1 wherein $R_1$ and $R_3$ are $C_1$ to $C_{10}$ fluorinated aliphatic hydrocarbon chains.

3. The process of claim 2 wherein $R_2$ is hydrogen.

4. The process of claim 3 wherein n is 1.5.

5. The process of claim 4 wherein the monoolefin is selected from the group consisting of 2-methylheptene-1, propylene, butene-1, octene-1 and mixtures thereof.

6. The process of claim 5 wherein the cobalt transition complex is the cobalt neodecanoate complex of 1,1,1,5,5,-5-hexafluoro 2,4-pentadione.

7. The process of claim 5 wherein the cobalt transition complex is the cobalt neodecanoate complex of 1,1,1,5,5,-6,6,7,7,7-decafluoro-2,4-heptanedione.

8. The process of claim 7 wherein the monoolefin is 2-methylheptene-1.

9. The process of claim 1 wherein said monoolefin contacting is conducted in the presence of neodecanoic anhydride.

10. The process of claim 9 wherein the amount of neodecanoic anhydride present is in the range of from 1:1 to about 20:1 moles per mole of cobalt present in the reaction zone.

11. The process of claim 1 wherein said diketone complex is present in catalytic amounts of from 0.1 to 0.001 molar.

* * * * *